(12) United States Patent
Aoki et al.

(10) Patent No.: US 6,495,059 B1
(45) Date of Patent: Dec. 17, 2002

(54) MAGNETIC FERRITE COMPOSITION AND PROCESS OF PRODUCTION THEREOF

(75) Inventors: Takuya Aoki, Tokyo (JP); Takeshi Nomura, Tokyo (JP)

(73) Assignee: TDK Corporation, Tokyo (JP)

(*) Notice: Subject to any disclaimer, the term of this patent is extended or adjusted under 35 U.S.C. 154(b) by 36 days.

(21) Appl. No.: 09/661,431

(22) Filed: Sep. 13, 2000

(30) Foreign Application Priority Data

Sep. 20, 1999 (JP) .......................................... 11-264775

(51) Int. Cl.[7] .............................. C01G 49/00; H01F 1/34
(52) U.S. Cl. ................. 252/62.6; 252/62.61; 252/62.56; 252/62.62; 252/62.64
(58) Field of Search .......................... 252/62.61, 62.6, 252/62.62, 62.64, 62.56

(56) References Cited

U.S. PATENT DOCUMENTS 4,485,085 A * 11/1984 David et al. ............. 252/62.56
5,626,789 A * 5/1997 Varshney ................. 252/62.56

FOREIGN PATENT DOCUMENTS

JP          6-132111          5/1994

* cited by examiner

Primary Examiner—C. Melissa Koslow
(74) Attorney, Agent, or Firm—Oliff & Berridge, PLC

(57) ABSTRACT

A magnetic ferrite composition including at least one of Mg, Ni, Cu, Zn, Mn, and Li and having a content of carbon within a predetermined range, for example, over 9.7 weight ppm to less than 96 weight ppm. The composition may be used as the magnetic core for an inductor, transformer, coil, etc. used for radios, televisions, communication devices, office automation equipment, switching power sources, and other electronic apparatuses or magnetic heads for video apparatuses or magnetic disk drives or other electronic components.

6 Claims, 6 Drawing Sheets

MAGNETIC FERRITE COMPOSITION AND PROCESS OF PRODUCTION THEREOF

BACKGROUND OF THE INVENTION

1. Field of the Invention

The present invention relates to a ferrite composition and a process of production thereof.

2. Description of the Related Art

Mn—Zn ferrite components, Ni—Cu—Zn ferrite components, Mn—Mg—Zn ferrite components, and other magnetic ferrite compositions are made broad use of for various types of electronic apparatuses as for example magnetic cores for coils, transformers, magnetic heads, etc.

Along with the recent reduction in size and reduction in thickness of electronic apparatuses, a similar reduction in size and reduction in thickness of the magnetic ferrite components have become desirable. In order to maintain the reliability of the product along with this, a higher mechanical strength and higher magnetic characteristics are demanded.

From this viewpoint, to improve the mechanical strength, there are known the methods of using a hot press for manufacture, reducing the particle diameter of the raw material powder and lowering the sintering temperature to reduce the crystal particle diameter, or adding various types of additives to reduce the crystal particle diameter. Further, to improve the magnetic characteristics, there are known the methods of adding various types of additives and optimizing the sintering conditions.

With the method of using a hot press to improve the mechanical strength, however, the production time becomes longer and expensive equipment is required, so there are large cost demerits.

Further, with the method of making the raw material powder finer to improve the mechanical strength, a separate process for reducing the particle diameter becomes necessary. Also, the finer raw material powder is extremely difficult to handle when producing a magnetic ferrite component.

Further, with the method of improving the mechanical characteristics by adding various types of additives, there are large cost demerits and balancing the various magnetic characteristics becomes difficult in some cases.

Still further, with the method of improving the magnetic characteristics by optimizing the sintering conditions, control of the sintering atmosphere, temperature raising and lowering rate, etc. becomes difficult, introduction of new equipment becomes necessary in some cases, and other problems arise.

Note that Japanese Unexamined Patent Publication (Kokai) No. 1994-132111 discloses the amount of carbon contained in a ferrite sintered body, but makes no mention at all of the control of the same. Further, the actually included amount of carbon is normally about the same extent as the amount of carbon included in a sintered body obtained by removing the binder and then sintering (about 100 ppm) and it is difficult to secure sufficient mechanical strength. That is, in the above publication, the raw material powder is compacted by cold isostatic pressing and sintered in the state with difficult release of oxygen when the hematite material changes to spinel type ferrite. Therefore, the carbon added to the raw material powder before sintering or the reducing agent breaking down under heating to become carbon has an effect on the magnetic characteristics of the phase after sintering. Further, the above publication makes no mention at all of the effect of the residual carbon on the strength and magnetic characteristics.

SUMMARY OF THE INVENTION

An object of the present invention is to solve the above problems in the related art and provide a ferrite composition having a high mechanical strength and superior magnetic characteristics even when reducing the size and reducing the thickness and a process for production of the same.

The present inventors took note of the content of carbon in a magnetic ferrite composition and controlled the same to thereby perfect the present invention. Note that in the present invention, a "magnetic ferrite composition" is used in the sense including both a ferrite material and ferrite sintered body.

The magnetic ferrite composition according to the present invention is characterized by including at least one of Mg, Ni, Cu, Zn, Mn, and Li and having a content of carbon of less than 96 weight ppm, preferably not more than 91 weight ppm, more preferably not more than 77 weight ppm, particularly preferably not more than 70 weight ppm.

The ferrite composition preferably includes, in addition to Mg, at least one of Cu, Zn, Mn, Ni, and Li. A typical example of this ferrite composition is Mg-Cu—Zn ferrite. In such a ferrite composition, the content of the carbon is preferably over 9.7 weight ppm (more than 9.7 weight ppm), more preferably at least 10 weight ppm, particularly preferably at least 15 weight ppm. Further, in such a ferrite composition, the content of carbon is preferably not more than 91 weight ppm.

The ferrite composition may be a ferrite composition including at least Mn and Zn. A typical example of such a ferrite composition is an Mn—Zn ferrite composition. In such a ferrite composition, the content of carbon is less than 52 weight ppm, preferably not more than 50 weight ppm, more preferably not more than 45 weight ppm. Further, in such a ferrite composition, the content of carbon is preferably over 9.8 weight ppm (more than 9.8 weight ppm), more preferably at least 10 weight ppm, particularly preferably at least 15 weight ppm.

The ferrite composition may further include as an additional component at least one oxide selected from silicon oxide, calcium oxide, tin oxide, titanium oxide, niobium oxide, zirconium oxide, vanadium oxide, molybdenum oxide, bismuth oxide, and tantalum oxide.

Further, the ferrite composition may be a ferrite composition including at least one of Cu, Zn, and Mn in addition to Ni. A typical example of such a ferrite composition is an Ni—Cu—Zn ferrite composition. In such a ferrite composition, the content of carbon is less than 67 weight ppm, preferably not more than 60 weight ppm, more preferably not more than 50 weight ppm, particularly preferably not more than 45 weight ppm. Further, in such a ferrite composition, the content of carbon is preferably over 9.7 weight ppm (more than 9.7 weight ppm), more preferably at least 10 weight ppm, particularly preferably at least 15 weight ppm.

The process of production of a magnetic ferrite composition according to the present invention controls a flow rate of gas blown into the sintering furnace so as to control the amount of carbon contained in the ferrite composition.

Further, the method of adjusting the bending strength of the magnetic ferrite composition according to the present invention controls the content of the carbon contained in the magnetic ferrite composition.

In the present invention, by controlling the content of the carbon in the magnetic ferrite composition, it is possible to improve the mechanical strength of the magnetic ferrite composition (for example, to give a bending strength of preferably at least 8 kgf/mm$^2$, more preferably at least 10 kgf/mm$^2$) and to provide a highly reliable ferrite composition with little cracking or chipping.

In the present invention, by controlling the content of the carbon in the magnetic ferrite composition to within a predetermined range, it is possible to improve the bending strength while maintaining a high magnetic permeability $\mu$ in a magnetic ferrite composition of a predetermined composition. Further, in a magnetic ferrite composition of another composition, it is possible to improve the bending strength while maintaining a low core loss.

Note that the carbon contained in the ferrite composition after sintering is considered to be the carbon component contained in the carbonate material and/or organic binder.

The ferrite composition according to the present invention may be used as the core of an inductor, transformer, coil, etc. used in an electronic apparatus such as a radio, television, communications apparatus, office automation apparatus, and switching power source or a magnetic head core used in an electronic apparatus such as a video apparatus or magnetic disk drive or other electronic components.

Among these, the Mg—Cu—Zn ferrite composition and Ni—Cu—Zn ferrite composition according to the present invention may be preferably used for inductors, while the Mn—Zn ferrite composition may be preferably used for transformers.

In the process of production of a ferrite composition according to the present invention, when producing the ferrite sintered body, it is possible to blow a gas into the sintering furnace at the time of sintering by a predetermined flow rate and skip the carbon component included in the granulated material to control the amount of carbon after sintering. Therefore, it is easy to balance the mechanical strength and the magnetic characteristics of the obtained ferrite sintered body.

The method of adjusting the bending strength of the ferrite sintered body according to the present invention can control the bending strength of the ferrite sintered body obtained by controlling the amount of carbon in the composition. This new discovery was made by the present inventors.

The present disclosure relates to subject matter contained in Japanese Patent Application No. 1999-264775, filed on September 20, the disclosure of which is expressly incorporated herein by reference in its entirety.

BRIEF DESCRIPTION OF THE DRAWINGS

These and other objects and features of the present invention will become clearer from the following description of the preferred embodiments given with reference to the attached drawings, in which.

DESCRIPTION OF THE PREFERRED EMBODIMENTS

First Embodiment

Figure 1:
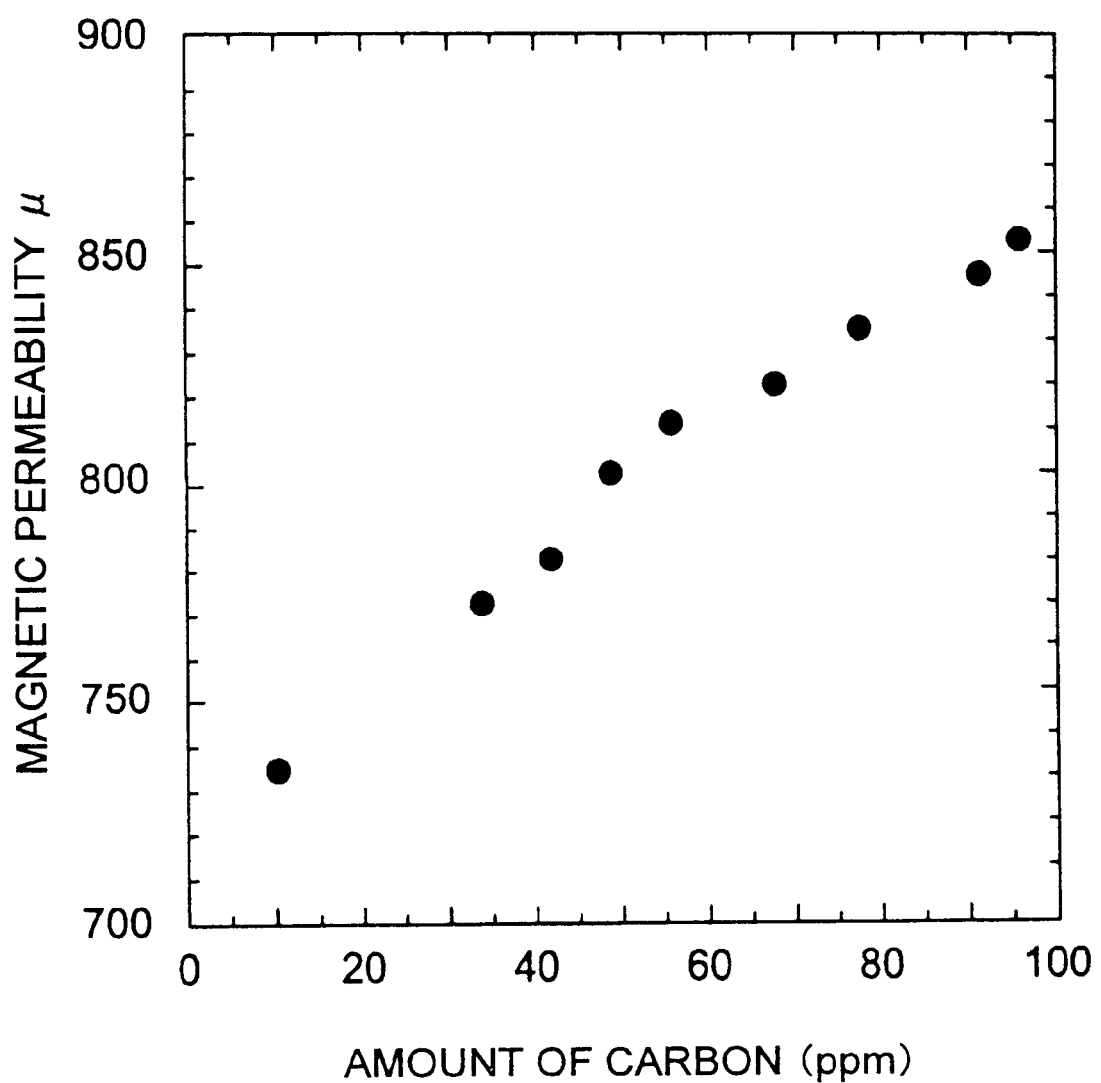
FIG. 1 is a graph of the relationship between the amount of carbon and magnetic permeability of the ferrite sintered bodies of Examples 1 to 7, Reference Example 1, and Comparative Example 1.

The ferrite sintered body according to the first embodiment can be produced for example as follows.

First, the starting materials are weighed and mixed so as to give the predetermined ratio of composition and obtain the raw material mixture.

The weighing is normally performed at an accuracy of 1/1000. As the method of mixing, for example, wet mixing using a ball mill and dry mixing using a dry mixer may be mentioned. Note that the average particle diameter of the starting material is preferably 0.1 to 3 $\mu$m.

The raw material mixture in the present embodiment contains, in addition to the iron oxide or material becoming iron oxide after sintering, at least one oxide selected from magnesium oxide, nickel oxide, copper oxide, zinc oxide, manganese oxide, lithium oxide, or materials becoming these metal oxides after sintering. Note that materials becoming metal oxides after sintering include metals alone, carbonates, hydroxides, halides, etc.

The composition of the ferrite composition of the present embodiment is not particularly limited. Various compositions may be selected in accordance with the objective, but it is preferable that the composition contain as main ingredients $Fe_2O_3$ and at least one oxide selected from the group of MgO, CuO, ZnO, MnO, NiO, and $Li_2O$. A typical example of the ferrite composition of the present embodiment is an Mg—Cu—Zn ferrite composition.

The raw material mixture in the present embodiment may also have various types of additives added to it in addition to the above main ingredients.

Note that the raw material mixture in the present embodiment may contain impurity elements in the material. As such elements, B, Al, Si, P, Ca, Cr, Co, Na, K, S, Cl, etc. may be mentioned. To keep down the power loss or effect on the magnetic characteristics, it is preferable that the ratio by weight of these elements with respect to the composition as a whole be not more than 200 ppm, but P and B have a large effect on the power loss or magnetic characteristics, so the ratio by weight of P with respect to the composition as a whole is preferably 0 to 30 ppm or the ratio by weight of B with respect to the composition as a whole is preferably 0 to 50 ppm.

Next, the raw material mixture is prefired to obtain a prefired material. The prefiring is performed to break down the materials by heat, homogenize the components, produce ferrite, eliminate ultra-fine particles due to sintering and grow the particle diameter to a suitable size of the particles, and convert the raw material mixture to a form suited for post processing. This prefiring is preferably performed at a temperature of 700 to 1000° C. normally for one to three hours. The prefiring may be performed in the air or in an atmosphere having a higher oxygen partial pressure than air or a pure oxygen atmosphere. Note that when including additional ingredients in the ferrite composition, the main ingredients and additional ingredients may be mixed before the prefiring or after the prefiring.

Next, the prefired material is pulverized to obtain a pulverized material. The pulverization is performed to break up aggregates of the prefired material to produce a powder having a suitable sinterability. When the prefired material forms large masses, the material is roughly pulverized then wet pulverized using a ball mill or attritor mill etc. The wet pulverization is performed until the average particle diameter of the prefired material becomes preferably 1 to 2 μm.

Next, the pulverized material is granulated to obtain a granulated material. The granulation is performed to make the pulverized material into aggregated particles of a suitable size to convert it to a form suitable for shaping. As this granulation method, for example, the press granulation method or spray dry method etc. may be mentioned. In the present embodiment, the spray dry method is used of adding polyvinyl alcohol or another ordinarily used binder to the pulverized material, then atomizing it in a spray dryer and drying it at a low temperature.

Next, the granulated material is shaped to a predetermined shape to obtain a shaped article. As the shaping of the granulated material, for example, dry shaping, wet shaping, extrusion, etc. may be mentioned, but in the present embodiment, the dry shaping method of filling the granulated material into a mold and then pressing it is used. The shape of the shaped article is not particularly limited, but for example a toroidal shape etc. may be mentioned.

Next, the shaped article is sintered to obtain a ferrite sintered body of the composition according to the present embodiment. The sintering is performed to cause the powder particles of the shaped article including the large number of voids to become cohesive at a temperature under the melting point to obtain a dense sintered body. As the furnace used for the sintering, one of the batch type, pusher type, cart type, etc. may be mentioned.

In the present embodiment, for example air or another gas is blown into the furnace during sintering by a flow rate of preferably more than 25 ml/min to less than 5000 ml/min, more preferably 200 to 4000 ml/min.

If the flow rate of gas blown into the furnace is too small, the amount of carbon contained after sintering tends to become large and the mechanical strength of the ferrite sintered body obtained to become low. Further, if the flow rate of the gas blown into the furnace is too large, the amount of carbon contained after sintering tends to become too small and the magnetic permeability of the obtained ferrite sintered body to become low. That is, by sintering while blowing gas into the furnace by a predetermined flow rate, it is possible to control the amount of carbon contained after sintering and balance the mechanical strength (bending strength) and magnetic characteristics (magnetic permeability) of the obtained ferrite sintered body.

The sintering temperature is preferably 900 to 1300° C. If the sintering temperature is too low, not only does the sintering tend to become insufficient, but also the amount of carbon contained after sintering tends to become larger. The sintering time is normally about 1 to 3 hours. The sintering may be performed in the air or in an atmosphere with an oxygen partial pressure higher than air.

By going through the above process, a ferrite sintered body controlled in amount of carbon to a suitable value is obtained.

The average crystal particle diameter of the ferrite sintered body is preferably 1 to 30 μm. If the average crystal particle diameter is too small, the hysteresis loss tends to become large, while if the average crystal particle diameter is too large, the eddy current loss tends to become large.

The ferrite sintered body of the composition according to the present embodiment can be improved in mechanical strength while maintaining a high magnetic permeability by controlling the content of carbon to within a predetermined range (over 9.7 weight ppm to less than 96 weight ppm). Further, according to the process of the present embodiment, the content of the carbon is controlled by sintering while blowing gas by a predetermined flow rate into the furnace, so it is possible to produce a ferrite sintered body controlled in amount of carbon after sintering to a suitable amount simply and inexpensively. Accordingly, by using this ferrite sintered body to construct an inductor magnetic core, it is possible to obtain a product superior in magnetic permeability, prevented from cracking or chipping even if thin, and superior in reliability. Further, this contributes to the reduction of size and reduction of cost of the product.

Second Embodiment

The ferrite sintered body according to the second embodiment may be produced for example in the following way.

In the same way as the first embodiment, first, the starting materials are weighed and mixed to a predetermined ratio of composition to obtain a raw material mixture. Note that the average particle diameter of the starting materials is preferably 0.1 to 3 μm.

The composition of the ferrite composition is not particularly limited. Various compositions may be selected in accordance with the objective. Preferably, the ferrite composition contains, in addition to $Fe_2O_3$, MnO and ZnO. A typical example of the ferrite composition of the present embodiment is an Mn—Zn ferrite composition.

In this case, the raw material mixture contains as main ingredients iron oxide, manganese oxide, and zinc oxide or materials becoming these metal oxides after sintering. Note that materials becoming metal oxides after sintering include metals alone, carbonates, hydroxides, halides, etc.

The raw material mixture in the present embodiment preferably has the following additional ingredients added to it in addition to the above main ingredients.

The additional ingredients include at least one oxide selected from silicon oxide, calcium oxide, tin oxide, titanium oxide, niobium oxide, zirconium oxide, vanadium oxide, molybdenum oxide, bismuth oxide, and tantalum oxide.

Preferably, the additional ingredients include at least one oxide selected from silicon oxide in an amount of addition converted to $SiO_2$ of 50 to 2000 ppm, calcium oxide in an amount of addition converted to CaO of 100 to 3100 ppm, tin oxide in an amount of addition converted to $SnO_2$ of not more than 8500 ppm (not including 0), titanium oxide in an amount of addition converted to $TiO_2$ of not more than 12000 ppm (not including 0), niobium oxide in an amount of addition converted to $Nb_2O_5$ of 50 to 300 ppm, zirconium oxide in an amount of addition converted to $ZrO_2$ of 200 to 1200 ppm, vanadium oxide in an amount of addition converted to $V_2O_5$ of 100 to 1100 ppm, molybdenum oxide in an amount of addition converted to $MoO_3$ of 50 to 310 ppm, bismuth oxide in an amount of addition converted to $Bi_2O_3$ of 350 to 800 ppm, and tantalum oxide in an amount of addition converted to $Ta_2O_5$ of 400 to 1400 ppm. By adding these additional ingredients in this range, the Br (residual magnetic flux density) is reduced, the ΔB (=Bm−Br)

increases, the power loss decreases, and the magnetic characteristics are improved.

Note that the raw material mixture in the present embodiment may include impurity elements in the materials. As such elements, B, Al, P, Cr, Co, Na, K, S, Cl, etc. may be mentioned. To keep down the power loss and the effect on the magnetic characteristics, the ratio by weight of each element with respect to the composition as a whole is preferably not more than 200 ppm, but P and B have a large effect on the power loss or magnetic characteristics, so the ratio by weight of P with respect to the composition as a whole is preferably 0 to 30 ppm or the ratio by weight of B with respect to the composition as a whole is preferably 0 to 50 ppm.

Next, the raw material mixture is prefired, pulverized, granulated, and shaped, then sintered to obtain a ferrite shaped article in the same way as in the first embodiment. Further, in the present embodiment, an atmospheric gas preferably substantially the same as the sintering atmosphere is blown into the furnace during sintering at a flow rate of preferably more than 100 ml/min and less than 5000 ml/min, more preferably 300 to 4000 ml/min. If the flow rate of the atmospheric gas blown into the furnace is too small, the amount of carbon contained after sintering tends to become large, the mechanical strength of the ferrite sintered body obtained to become low, and further the core loss to increase. Further, if the flow rate of the atmospheric gas blown into the furnace is too large, the amount of carbon contained after sintering tends to become too small and the core loss of the obtained ferrite sintered body to become high. That is, by sintering while blowing atmospheric gas into the furnace by a predetermined flow rate, it is possible to control the content of carbon after sintering and possible to balance the mechanical strength (bending strength) and magnetic characteristics (core loss) of the ferrite sintered body obtained.

The sintering temperature is preferably 1200 to 1400° C. If the sintering temperature is too low, not only does the sintering tend to become insufficient, but also the amount of carbon contained after sintering tends to become larger. The sintering time is normally about 3 to 7 hours.

By going through the above process, a ferrite sintered body controlled in amount of carbon to a suitable value is obtained.

The average crystal particle diameter of the ferrite sintered body is preferably 1 to 30 $\mu$m. If the average crystal particle diameter is too small, the hysteresis loss tends to become large, while if the average crystal particle diameter is too large, the eddy current loss tends to become large.

The ferrite sintered body of the composition according to the present embodiment can be improved in mechanical strength while reducing the core loss by controlling the content of carbon to within a predetermined range (over 9.8 weight ppm to less than 52 weight ppm). Further, according to the process of the present embodiment, the content of the carbon is controlled by sintering while blowing gas by a predetermined flow rate into the furnace, so it is possible to produce a ferrite sintered body controlled in amount of carbon after sintering to a suitable amount simply and inexpensively. Accordingly, by using this ferrite sintered body to construct a transformer magnetic core, it is possible to obtain a product with a small core loss, prevented from cracking or chipping even if thin, and superior in reliability. Further, this contributes to the reduction of size and reduction of cost of the product.

Third Embodiment

The ferrite sintered body according to the third embodiment may be produced for example in the following way.

In the same way as the first and second embodiments, first, the starting materials are weighed and mixed to a predetermined ratio of composition to obtain a raw material mixture. Note that the average particle diameter of the starting materials is preferably 0.1 to 3 $\mu$m.

The raw material mixture in the present embodiment contains, in addition to the iron oxide and nickel oxide or material becoming these oxides after sintering, at least one oxide selected from copper oxide, zinc oxide, and manganese oxide or materials becoming these metal oxides after sintering. Note that materials becoming metal oxides after sintering include metals alone, carbonates, hydroxides, halides, etc.

The composition of the ferrite composition is not particularly limited. Various compositions may be selected in accordance with the objective. Preferably, the composition contains as main ingredients $Fe_2O_3$, NiO, and at least one oxide selected from CuO, ZnO, and MnO. A typical example of the ferrite composition of the present embodiment is an Ni—Cu—Zn ferrite composition.

The raw material mixture in the present embodiment may have added to it various types of additives in addition to the above main ingredients.

Note that the raw material mixture in the present embodiment may include impurity elements in the materials. As such elements, B, Al, Si, P, Ca, Cr, Co, Na, K, S, Cl, etc. may be mentioned. To keep down the power loss and the effect on the magnetic characteristics, the ratio by weight of each element with respect to the composition as a whole is preferably not more than 200 ppm, but P and B have a large effect on the power loss or magnetic characteristics, so the ratio by weight of P with respect to the composition as a whole is preferably 0 to 30 ppm or the ratio by weight of B with respect to the composition as a whole is preferably 0 to 50 ppm.

Next, the raw material mixture is prefired, pulverized, granulated, and shaped, then sintered to obtain a ferrite shaped article in the same way as in the first embodiment.

In the present embodiment, for example air or another gas is blown into the furnace during sintering by a flow rate of preferably more than 100 ml/min and less than 5000 ml/min, more preferably 200 to 4000 ml/min. If the flow rate of the gas blown into the furnace is too small, the content of the carbon after sintering becomes larger and the mechanical strength of the ferrite sintered body obtained ends to become low. Further, if the flow rate of gas blown into the furnace becomes too large, the content of carbon after sintering tends to become too small and the magnetic permeability of the ferrite sintered body obtained to become low. That is, by sintering the material while blowing gas into the furnace by a predetermined flow rate, it is possible to control the amount of carbon after sintering and possible to balance the mechanical strength (bending strength) and magnetic characteristics (magnetic permeability) of the ferrite sintered body obtained. Note that the sintering temperature, sintering time, and sintering atmosphere may be made the same as in the first embodiment.

By going through the above process, a ferrite sintered body controlled in amount of carbon to a suitable value is obtained.

The average crystal particle diameter of the ferrite sintered body is preferably 1 to 30 $\mu$m. If the average crystal particle diameter is too small, the hysteresis loss tends to become large, while if the average crystal particle diameter is too large, the eddy current loss tends to become large.

The ferrite sintered body of the composition according to the present embodiment can be improved in mechanical strength while maintaining a high magnetic permeability by controlling the amount of carbon to within a predetermined range (over 9.7 weight ppm to less than 60 weight ppm). Further, according to the process of the present embodiment, the content of the carbon is controlled by sintering while blowing gas by a predetermined flow rate into the furnace, so it is possible to produce a ferrite sintered body controlled in amount of carbon after sintering to a suitable amount simply and inexpensively. Accordingly, by using this ferrite sintered body to construct an inductor magnetic core, it is possible to obtain a product superior in magnetic permeability, prevented from cracking or chipping even if thin, and superior in reliability. Further, this contributes to the reduction of size and reduction of cost of the product.

Next, the present invention will be explained in further detail by more specific examples, but the present invention is not limited to these examples.

EXAMPLES 1 TO 7, REFERENCE EXAMPLE 1, COMPARATIVE EXAMPLE 1

As the materials, 48.0 mol % of $Fe_2O_3$, 19.3 mol % of MgO, 7.1 mol % of CuO, and 25.6 mol % of ZnO were weighed, then wet mixed by a ball mill for 16 hours to obtain a raw material mixture.

Next, the raw material mixture was prefired at 900° C. for 2 hours to obtain a prefired material, then was wet pulverized by a ball mill for 16 hours to obtain a pulverized material.

Next, 10 wt % of an 6% aqueous solution of polyvinyl alcohol was added as a binder to 100 wt % of the pulverized material and granulated to obtain a granulated material. This was pressed at a pressure of 1 ton/cm² to a toroidal shape to obtain a shaped article. Further, for the test of the bending strength, the material was pressed at a pressure of 1 ton/cm² to a rod shape of 5×5×500 mm to obtain a shaped article.

Next, these shaped articles were placed in a sintering furnace for sintering. This sintering was performed by blowing air inside the furnace while changing the flow rate of blowing as shown in Table 1 (unit: ml/min) in an air atmosphere at a sintering temperature of 1020° C. for a sintering time of 2 hours to obtain ferrite sintered bodies.

The amount of carbon of each ferrite sintered body obtained in this way (unit: ppm) was measured. The amount of carbon was measured using a carbon-sulfur analyzer (EMIA520) made by Horiba Seisakusho, sintering the sample by high frequency heating in a flow of oxygen, and measuring by the infrared absorption method. The results are shown in Table 1.

Further, the magnetic permeability $\mu$ of each obtained ferrite sintered body was measured. The magnetic permeability $\mu$ was found by winding a copper wire (wire diameter: 0.35 mm) around a sample 20 turns, measuring the inductance at a measurement frequency of 100 kHz and measurement current of 0.25 mA by an LCR meter (made by Hewlett-Packard), and calculating using the following equation (1). The results are shown in Table 1. The relationship with the amount of carbon is shown in FIG. 1.

$$\text{Magnetic permeability } \mu = (1e \times L)(\mu_0 \times Ae \times N^2) \quad (1)$$

Here, le is the length of the magnetic path, L is the inductance of the sample, $\mu_0$ is the magnetic permeability in vacuum=$4\pi \times 10^{-7}$ (H/m), Ae is the sectional area of the sample, and N is the number of turns of the coil.

Further, the bending strength was tested in accordance with JIS-R1601 using a rod-shaped ferrite sintered body.

Figure 2:
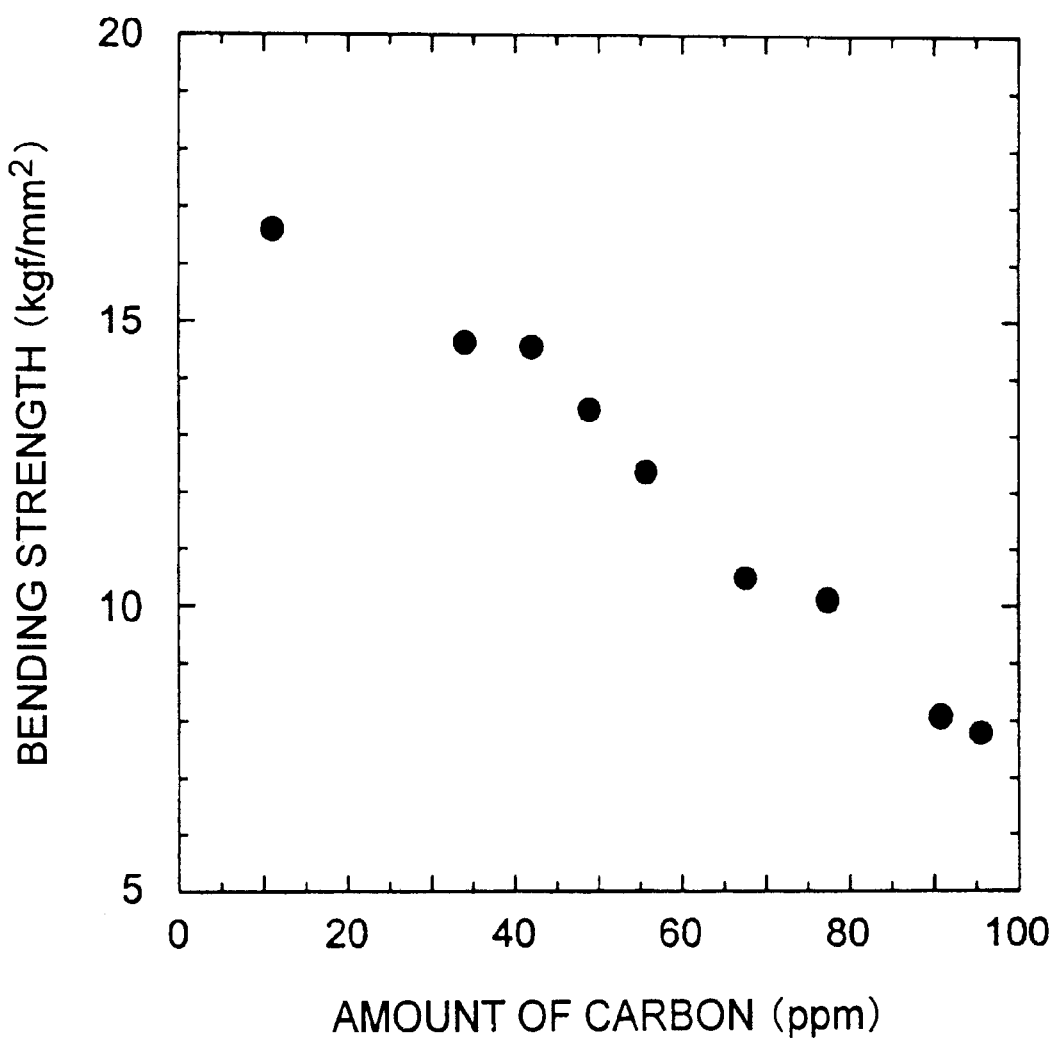
FIG. 2 is a graph of the relationship between the amount of carbon and bending strength of the ferrite sintered bodies of Examples 1 to 7, Reference Example 1, and Comparative Example 1.

The results are shown in Table 1. The relationship with the amount of carbon is shown in FIG. 2.

TABLE 1

|  | Gas flow rate (ml/min) | Am't of carbon (ppm) | Bending strength (kgf/mm²) | Magnetic permeability $\mu$ |
| --- | --- | --- | --- | --- |
| Comp. Ex. 1 | 25 | 96 | 7.8 | 852 |
| Ex. 1. | 50 | 91 | 8 | 845 |
| Ex. 2 | 100 | 77 | 10 | 833 |
| Ex. 3 | 200 | 67 | 10.4 | 821 |
| Ex. 4 | 300 | 55 | 12.3 | 812 |
| Ex. 5 | 500 | 48 | 13.4 | 802 |
| Ex. 6 | 1000 | 41 | 14.5 | 782 |
| Ex. 7 | 3000 | 33 | 14.6 | 772 |
| Ref. Ex. 1 | 5000 | 9.7 | 16.5 | 734 |

From the above results, it was confirmed that if the amount of the carbon after sintering is 96 ppm (Comparative Example 1), the bending strength is a low 7.8 kgf/mm² and the ferrite shaped article lacks reliability.

As opposed to this, when the amount of carbon after sintering is not more than 91 ppm (Examples 1 to 7 and Reference Example 1), the bending strength is a sufficiently large 8 kgf/mm² to 16.5 kgf/mm² and the magnetic permeability $\mu$ is a sufficiently large 734 to 845. Among these, Examples 2 to 7 were well balanced in bending strength and magnetic permeability. Note that it was confirmed that when the amount of carbon after sintering is 9.7 ppm (Reference Example 1), while the magnetic permeability tends to fall somewhat, there is not that much of a problem in practice.

EXAMPLES 8 to 11, REFERENCE EXAMPLE 2, AND REFERENCE EXAMPLE 3

53.6 mol % of $Fe_2O_3$, 36.2 mol % of MnO, and 10.2 mol % of ZnO were weighed, then wet mixed by a ball mill for 16 hours to obtain a raw material mixture.

Next, the raw material mixture was prefired at 850° C. to obtain a prefired material, then 110 weight ppm of $SiO_2$ powder, 500 weight ppm of CaO powder, 3300 weight ppm of $SnO_2$ powder, 320 weight ppm of $Nb_2O_5$ powder, and 100 weight ppm of $MoO_3$ powder were added to 100 wt % of such a prefired material, then the results were wet pulverized by a ball mill for three hours to obtain a pulverized material.

Next, 10 wt % of an 8% aqueous solution of polyvinyl alcohol was added as a binder to 100 wt % of the pulverized material and the result granulated to obtain a granulated material. This was pressed in the same way as in Examples 1 to 7 to obtain a toroidal shaped article and rod-shaped article.

Next, these shaped articles were placed in a sintering furnace for sintering. This sintering was performed by blowing a sintering atmosphere gas controlled in oxygen partial pressure inside the furnace while changing the flow rate of blowing as shown in Table 2 (unit: ml/min) in an atmosphere controlled in oxygen partial pressure at a sintering temperature of 1300° C. for a sintering time of 5 hours to obtain ferrite sintered bodies.

The amounts of carbon of the obtained ferrite sintered bodies were measured in the same way as in Examples 1 to 7. The results are shown in Table 2.

Figure 3:
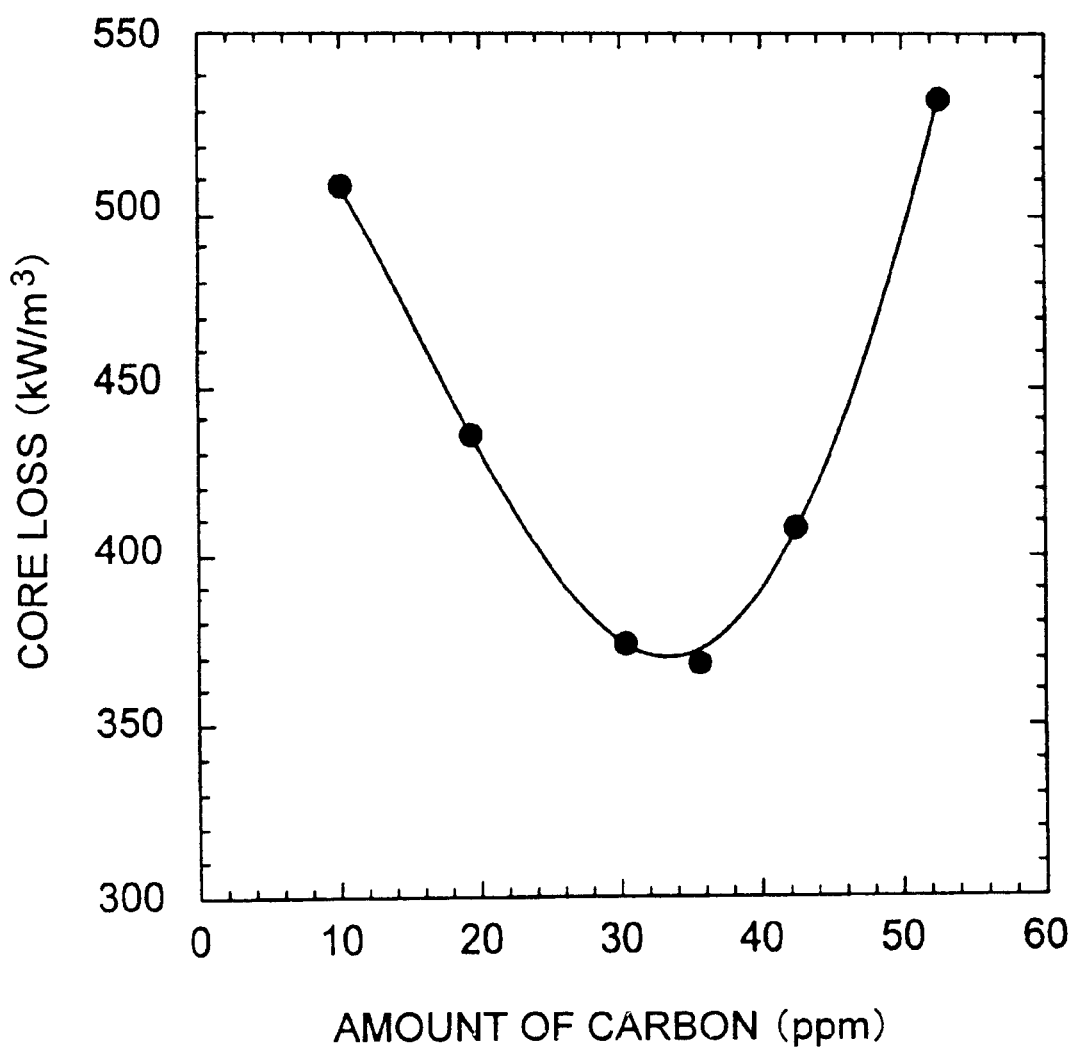
FIG. 3 is a graph of the relationship between the amount of carbon and core loss of the ferrite sintered bodies of Examples 8 to 11, Reference Example 2, and Reference Example 3.

Further, a sine wave alternating current magnetic field of 100 kHz and 200 mT was applied to the obtained ferrite sintered body based on JIS-C2561-1992 and the core loss at 100° C. (unit: kW/m³) was measured. The results are shown in Table 2. The relationship with the amount of carbon is shown in FIG. 3.

Figure 4:
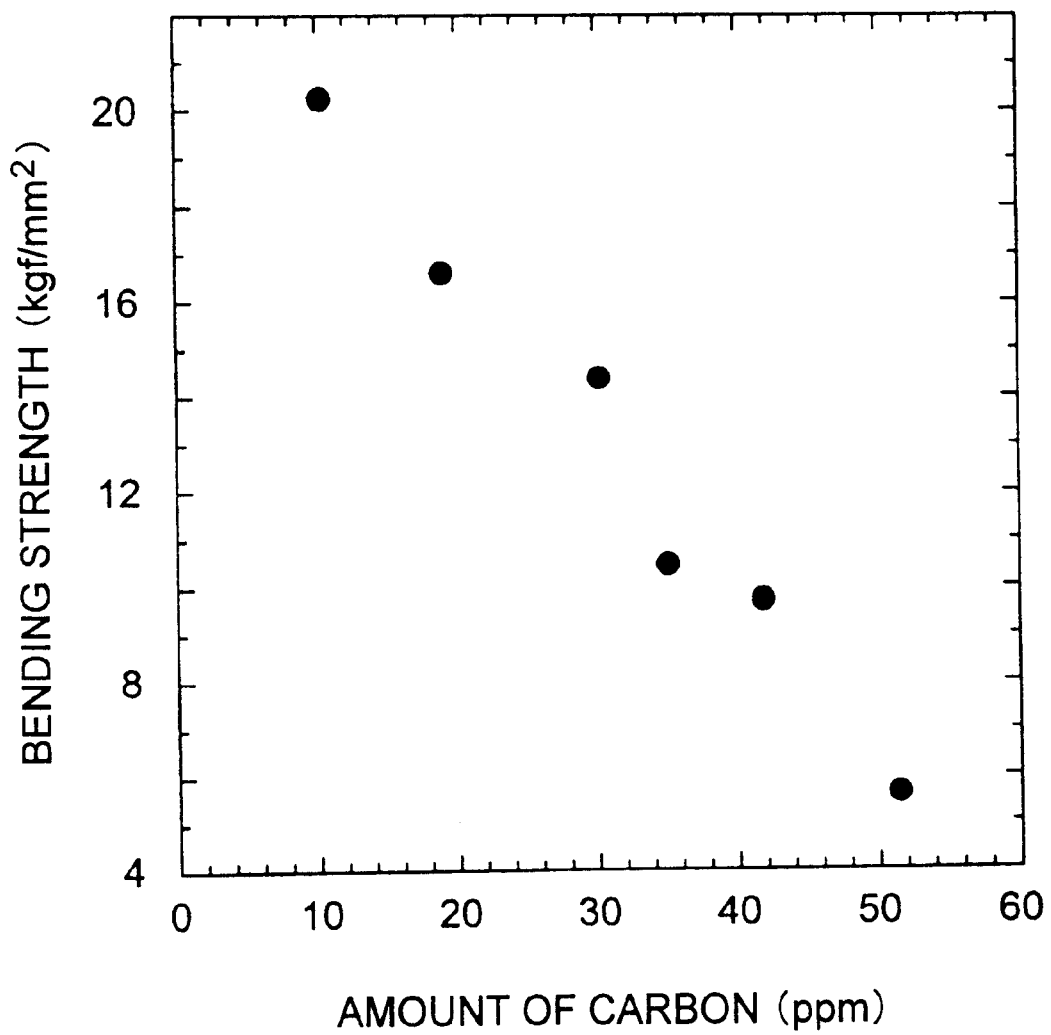
FIG. 4 is a graph of the relationship between the amount of carbon and bending strength of the ferrite sintered bodies of Examples 8 to 11, Reference Example 2, and Reference Example 3.
Figure 5:
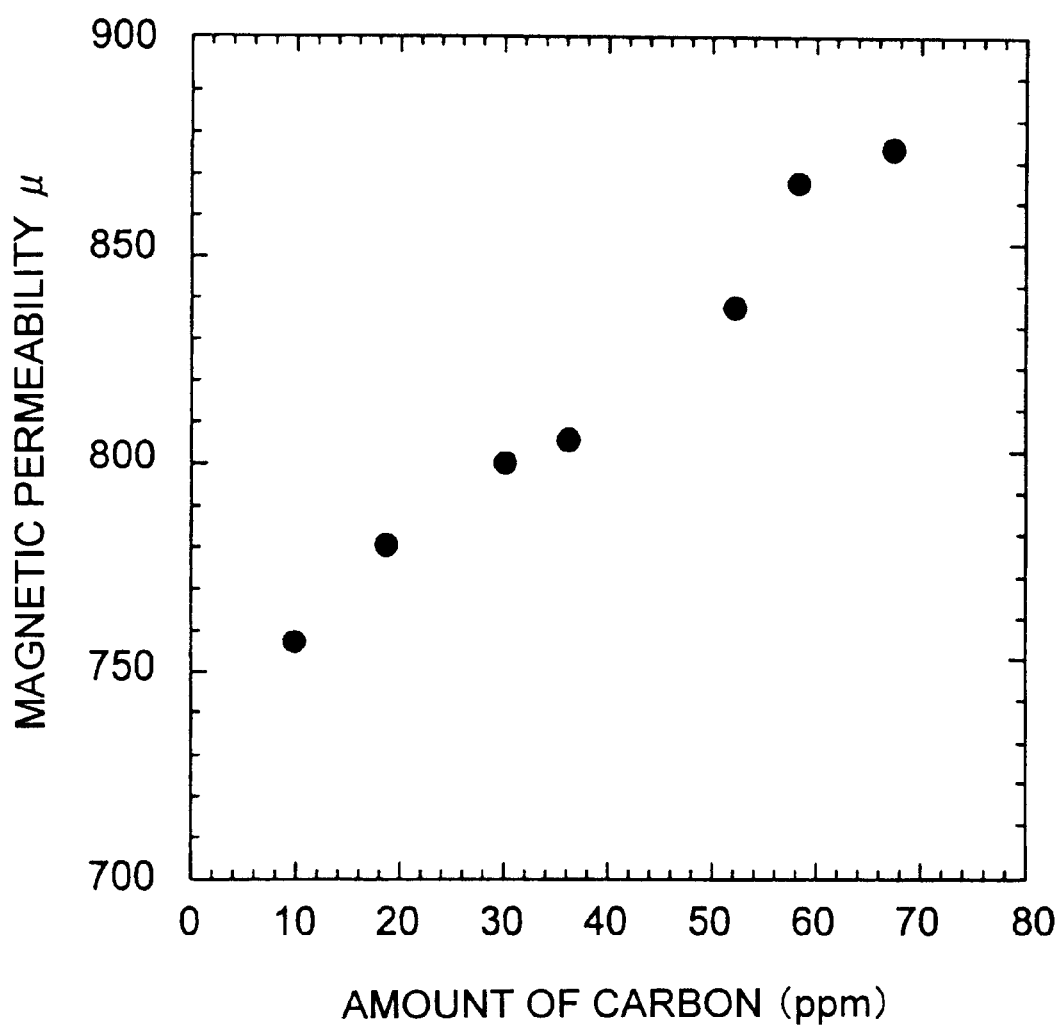
FIG. 5 is a graph of the relationship between the amount of carbon and magnetic permeability of the ferrite sintered bodies of Examples 12 to 16, Reference Example 4, and Reference Example 5.

Further, the same procedure was followed as in Examples 1 to 7 to test the bending strength using the rod shaped ferrite sintered body. The results are shown in Table 2. The relationship with the amount of carbon is shown in FIG. 4.

TABLE 2

|  | Gas flow rate (ml/min) | Am't of carbon (ppm) | Bending strength (kgf/mm$^2$) | Core loss (kW/m$^3$) |
|---|---|---|---|---|
| Ref. Ex. 2 | 100 | 52 | 5.7 | 530 |
| Ex. 8 | 300 | 42 | 9.7 | 407 |
| Ex. 9 | 500 | 35 | 10.4 | 368 |
| Ex. 10 | 1000 | 30 | 14.4 | 374 |
| Ex. 11 | 3000 | 18.6 | 16.6 | 433 |
| Ref. Ex. 3 | 5000 | 9.8 | 20.2 | 506 |

From the above results, it was confirmed that when the amount of carbon after sintering is 52 ppm (Reference Example 2), the bending strength is a relatively low 5.7 kgf/mm$^2$.

As opposed to this, when the amount of carbon after sintering is not more than 42 ppm (Examples 8 to 11 and Reference Example 3), the bending strength is a sufficiently large 9.7 kgf/mm$^2$ to 20.2 kgf/mm$^2$ and the core loss is also a sufficiently low 368 kW/m$^3$ to 433 kW/m$^3$. Among these, Examples 8 to 11 were well balanced in bending strength and core loss. Note that it was confirmed that when the amount of carbon after sintering is 9.8 ppm (Reference Example 3), the core loss tends to become somewhat greater, but this is not that much of a problem in practice.

EXAMPLES 12 TO 16, REFERENCE EXAMPLE 4, AND REFERENCE EXAMPLE 5

The same procedure was followed as in Examples 1 to 7 to obtain toroidal shaped articles and rod shaped articles except for using 49.5 mol % of Fe$_2$O$_3$, 9 mol % of NiO, 10 mol % of CuO, and 31.5 mol % of ZnO as materials.

Next, the shaped articles were placed in the sintering furnace for sintering. The sintering was performed by blowing air into the furnace while changing the flow rate of blowing as shown in Table 3 (unit: ml/min) in an air atmosphere at a sintering temperature of 1100° C. and a sintering time of 2 hours to obtain ferrite sintered bodies.

The amount of carbon of each ferrite sintered body found in this way was measured in the same way as in Examples 1 to 7. The results are shown in Table 3.

Figure 6:
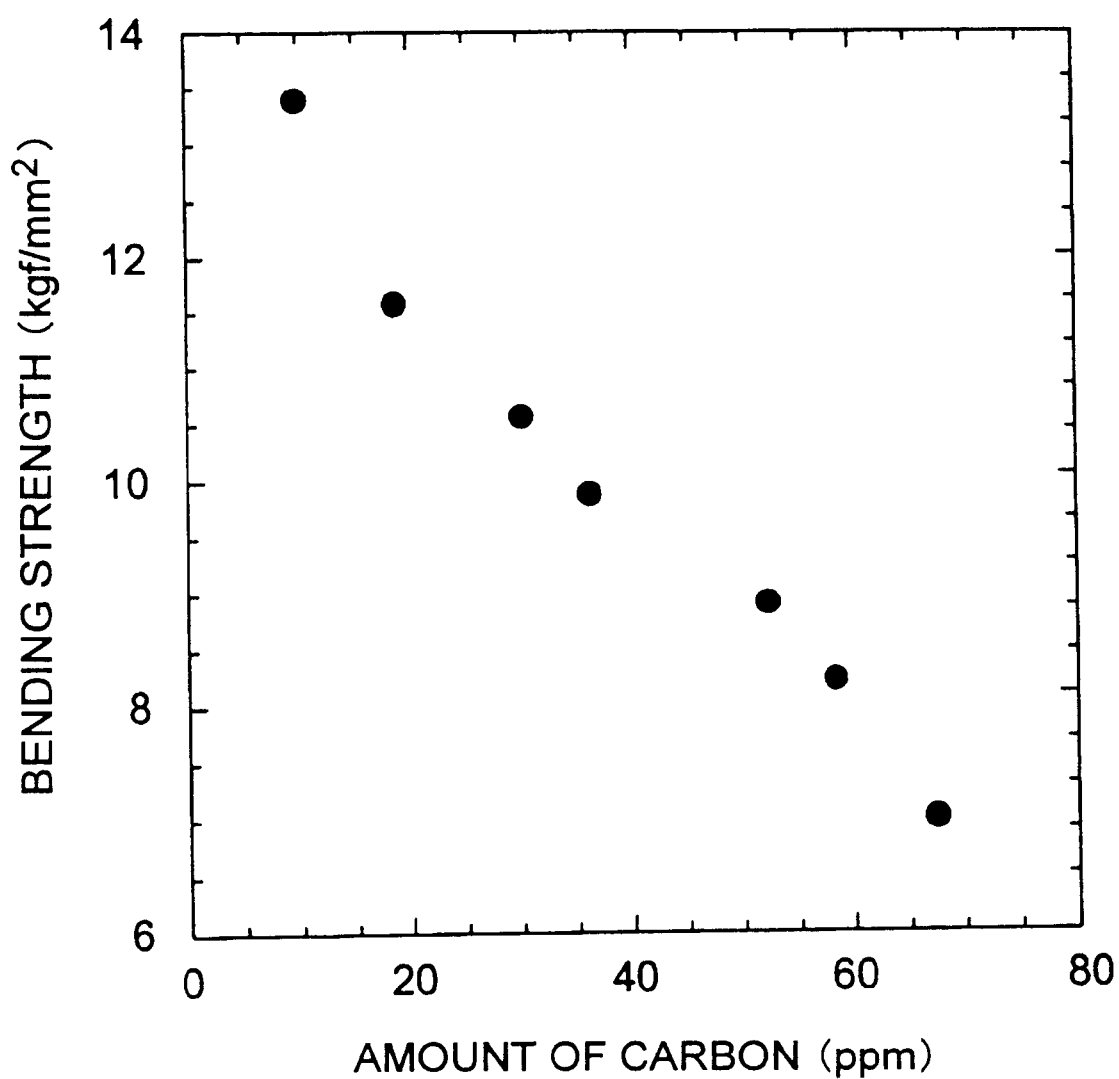
FIG. 6 is a graph of the relationship between the amount of carbon and bending strength of the ferrite sintered bodies of Examples 12 to 16, Reference Example 4, and Reference Example 5.

Further, the magnetic permeability $\mu$ of each obtained ferrite sintered body was measured in the same way as in Examples 1 to 7. The results are shown in Table 3. The relationship with the amount of carbon is shown in FIG. 6.

Further, the bending strength was tested in the same way as in Examples 1 to 7 using the rod-shaped ferrite sintered bodies. The results are shown in Table 3. The relationship with the amount of carbon is shown in FIG. 6.

TABLE 3

|  | Gas flow rate (ml/min) | Am't of carbon (ppm) | Bending strength (kgf/mm$^2$) | Magnetic permeabilit y $\mu$ |
|---|---|---|---|---|
| Ref. Ex. 4 | 100 | 67 | 7.1 | 872 |
| Ex. 12 | 200 | 58 | 8.3 | 864 |
| Ex. 13 | 300 | 52 | 9 | 834 |
| Ex. 14 | 500 | 36 | 9.9 | 804 |
| Ex. 15 | 1000 | 30 | 10.6 | 798 |
| Ex. 16 | 3000 | 18.6 | 11.6 | 778 |
| Ref. Ex. 5 | 5000 | 9.7 | 13.4 | 755 |

From the above results, it was confirmed that if the amount of carbon after sintering is 67 ppm (Reference Example 4), the bending strength is a relatively low 7.1 kgf/mm$^2$.

As opposed to this, when the amount of carbon after sintering is not more than 58 ppm (Examples 12 to 16 and Reference Example 5), the bending strength is a sufficiently large 8.3 kgf/mm$^2$ to 13.4 kgf/mm$^2$ and the magnetic permeability $\mu$ is a sufficiently large 755 to 864. Among these, Examples 14 to 16 were well balanced in the bending strength and magnetic permeability. Note that when the amount of carbon after sintering is 9.7 ppm (Reference Example 5), it was confirmed that while the magnetic permeability tends to fall somewhat, there is not that much of a problem in practice.

Note that above the explanation was made of embodiments and examples of the present invention, but the invention is not limited to these embodiments or examples in any way. It is of course possible to work the invention in various ways within the range of the gist of the invention.

What is claimed is:

1. A process of producing a magnetic ferrite composition including at least one of Cu, Zn, Mn, Ni, and Li in addition to Mg, comprising sintering a ferrite material while blowing a gas into a furnace at a flow rate of over 25 ml/min and less than 5000 ml/min.

2. A process of producing a magnetic ferrite composition including at least Mn and Zn, comprising:
   sintering a ferrite material while blowing a gas controlled in oxygen partial pressure into a furnace at a flow rate of 300 ml/min to 3000 ml/min.

3. A process of producing a magnetic ferrite composition including at least one of Cu, Zn, and Mn in addition to Ni, comprising:
   sintering a ferrite material while blowing a gas into a furnace at a flow rate of 300 ml/min to 3000 ml/min.

4. A method of adjusting the bending strength of a magnetic ferrite composition including at least one of Cu, Zn, Mn, Ni, and Li in addition to Mg, comprising producing the magnetic ferrite composition by sintering a ferrite material while blowing a gas into a furnace at a flow rate of over 25 ml/min and less than 5000 ml/min.

5. A method of adjusting the bending strength of a magnetic ferrite composition including at least Mn and Zn, comprising:
   producing the magnetic ferrite composition by sintering a ferrite material while blowing a gas controlled in oxygen partial pressure into a furnace at a flow rate of 300 ml/min to 3000 ml/min.

6. A method of adjusting the bending strength of a magnetic ferrite composition including at least one of Cu, Zn and Mn, in addition to Ni, comprising:
   producing the magnetic ferrite composition by sintering a ferrite material while blowing a gas into a furnace at a flow rate of 300 ml/min to 3000 ml/min.

* * * * *